United States Patent 3,389,163
June 18, 1968

3,389,163
2-BROMO-4-THIOCYANO-6-ISOPROPYLPHENOL
Martin B. Neuworth and Robert J. Laufer, Pittsburgh, Pa., assignors, by mesne assignments, to Consolidation Coal Company, a corporation of Delaware
No Drawing. Filed Oct. 18, 1965, Ser. No. 497,551
1 Claim. (Cl. 260—454)

The present invention relates to a novel compound, specifically, 2 - bromo-4-thiocyano - 6 - isopropylphenol, which we have found to be an excellent paint fungicide, useful in both latex and oil paints.

The preparation of 2 - bromo-4-thiocyano-6-isopropylphenol may be illustrated by the following example. A stirred mixture of 1110 grams of ammonium thiocyanate, 943 grams of 2-isopropylphenol, and 2750 milliliters of methanol was cooled with solid carbon dioxide, and 530 grams of chlorine were added over a period of 140 minutes at 0° C. The reaction mixture was maintained at 0° for an additional 72 minutes; then was added to 10 liters of cold water with good agitation. The suspension of oil globules was neutralized by the addition of 600 milliliters of concentrated ammonium hydroxide. The oil solidified and the solid was collected on a filter, washed thoroughly with water, and dried in air to yield 95.5 percent of the theoretical weight of a pale yellow solid melting at 43.5–47.5° C. Recrystallization from benzenehexane gave light yellow prisms having a melting point of 47.0–50.0° C. Analysis established these prisms to be 2-isopropyl-4-thiocyanophenol.

A solution of 436 grams of 2-isopropyl-4-thiocyanophenol in 900 milliliters of diethyl ethel was stirred with 900 milliliters of water, and 360 grams of bromine were added over a one-hour period at 23–30° C. The crude product recovered from the organic phase, was crystallized from 450 milliliters of warm hexane to yield 543 grams of light tan product, melting point 38.0–40.5° C. Recrystallization from hexane-cyclohexane gave pale yellow prisms, melting point 43.0–45.0° C. These prisms were established by analysis to be 2-bromo-4-thiocyano-6-isopropylphenol.

The compound of this invention was evaluated as a paint fungicide, and its performance as such was compared with that of 6-bromo-4-thiocyano-2-t-butylphenol and of 2,6-di-isopropyl-4-thiocyanophenol. The evaluation comprised testing in vitro the inhibiting effect of the compound on the growth of the organism *Pullularia pullulans*. In addition to potency, the effect of the compounds under study on the properties of two different paint systems was determined. These properties which are usually affected are pH, viscosity, color, and odor. In order to determine response to actual commercial conditions, changes in these properties were determined by incorporating into the paint, 0.5 percent by weight of the thiocyanophenol. The latter, as used, was in the form of a dispersion in ethylene glycol, in the relative proportions of thiocyanophenol and glycol of 1 to 3. An acrylic latex top coat and an oil-based top coat were selected as the test paint systems. Property changes were determined after one week's storage at 140° F.

In summary, it was found that all three compounds tested had little or no adverse effect on the properties of either of the two paint vehicles. However, only 2-bromo-4-thiocyano-6-isopropylphenol possessed any activity as a paint fungicide. Its activity was found to be many-fold greater than that of commercially available fungicides such as 2,3,4,6-tetrachlorophenol and phenyl mercury oleate; and furthermore, in both latex and oil-based paints, in contrast to the commercially available fungicides which seldom function well in both vehicles.

According to the provisions of the patent statutes, we have explained the principle, preferred construction, and mode of operation of our invention and have illustrated and described what we now consider to represent its best embodiment. However, we desire to have it understood that, within the scope of the appended claim, the invention may be practiced otherwise than as specifically illustrated and described.

We claim:
1. 2-bromo-4-thiocyano-6-isopropylphenol.

References Cited

UNITED STATES PATENTS

| | | | |
|---|---|---|---|
| 2,562,948 | 8/1951 | Robbins et al. | 260—454 |
| 3,246,039 | 4/1966 | Reifschneider | 260—454 XR |
| 3,274,257 | 9/1966 | Reifschneider et al. | 260—454 XR |
| 3,303,206 | 2/1967 | Reifschneider | 260—454 |
| 3,328,243 | 6/1967 | Wolf et al. | 260—454 XR |

CHARLES B. PARKER, *Primary Examiner.*

D. H. TORRENCE, *Assistant Examiner.*